US006744527B1

(12) United States Patent
Dorsey et al.

(10) Patent No.: US 6,744,527 B1
(45) Date of Patent: Jun. 1, 2004

(54) USER INTERFACE FOR NAVIGATION AND CONTROL OF A PRINTING SYSTEM

(75) Inventors: Jonathan A. Dorsey, Rochester, NY (US); Thomas A. Myers, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/342,713

(22) Filed: Jun. 29, 1999

(51) Int. Cl.⁷ .......................... G06K 15/02; G06F 13/00
(52) U.S. Cl. ...................... 358/1.12; 358/1.14
(58) Field of Search .................. 358/1.15, 1.12, 358/1.13, 1.14; 710/15–17; 101/35, 212, 282; 345/349

(56) References Cited

U.S. PATENT DOCUMENTS

| 5,081,595 | A | | 1/1992 | Moreno et al. ............. 395/111 |
| 5,383,129 | A | | 1/1995 | Farrell .................. 364/464.01 |
| 5,398,289 | A | * | 3/1995 | Rourke et al. ................. 381/1 |
| 5,467,434 | A | * | 11/1995 | Hower, Jr. et al. .......... 395/114 |
| 5,835,820 | A | | 11/1998 | Martin et al. ................. 399/85 |
| 5,887,990 | A | * | 3/1999 | Card et al. ................... 400/61 |
| 6,219,151 | B1 | * | 4/2001 | Manglapus et al. ........ 358/1.15 |
| 6,337,745 | B1 | * | 1/2002 | Aiello, Jr. et al. ......... 358/1.15 |

FOREIGN PATENT DOCUMENTS

| EP | 0 478 341 A2 | 4/1992 |
| WO | WO 94/11804 | 5/1994 |

* cited by examiner

Primary Examiner—David Moore
Assistant Examiner—Douglas Tran
(74) Attorney, Agent, or Firm—David J. Arthur

(57) ABSTRACT

The present invention relates to a printing system, and more particularly to a user interface for navigating and controlling a printing system to generate documents received from one or more input units including a computer network, scanner, modem, etc. Since the operator or user wishes to offer a wide variety of printing options to customers and complete customer orders as quickly as possible, minimizing the interruption of print jobs is a very important priority. By replenishing supplies such as stock and toner in a timely fashion, the utilization of the printing systems can be maximized. In order for the operator to more efficiently utilize the printing system to perform a large number of print jobs with as few interruptions as possible, the present invention provides a user friendly navigational tool, which can provide the operator with information regarding the amount of printing supplies currently available in the printing system.

8 Claims, 20 Drawing Sheets

USER INTERFACE FOR NAVIGATION AND CONTROL OF A PRINTING SYSTEM

Attention is directed to copending applications U.S. patent application Ser. No. 09/342,949, filed Jun. 29, 1999, entitled, "RESOURCE MANAGEMENT VIA JOB TICKET" and U.S. Pat. No. 6,504,556, entitled OPERATOR NOTATION TOOL TIP". The disclosures of these applications are hereby incorporated by reference in their entirety.

FIELD OF THE INVENTION

The present invention relates to a printing system, and more particularly to a user interface for navigating and controlling a printing system to generate documents received from one or more input units including a computer network, scanner, modem, etc.

BACKGROUND OF THE INVENTION

Present and future high capacity printing systems are intended to provide an operator or user with as many job programming options and selections as reasonably possible. For example, at least four developer housings containing four different types of toner are utilized to provide color copying. Further, operators wish to choose from a very large variety of stock. Stock is the print media or support material on which prints are made. The number of print media choices is very large considering the great number of different sheet sizes, colors, and types that are used by customers today. The number is even larger due to the printing needs of different foreign countries.

Since the operator or user wishes to offer a wide variety of printing options to customers and complete customer orders as quickly as possible, minimizing the interruption of print jobs is a very important priority. By replenishing supplies such as stock and toner in a timely fashion, the utilization of high capacity printing systems can be maximized.

A large amount of information concerning the status of the current print job and the requirements of requested print jobs which have not yet been performed, is required to maximize the utilization of the printing system. In order for the operator to more efficiently utilize the printing system to perform a large number of print jobs with as few interruptions as possible, there is a need for a user friendly navigational tool, which can provide the operator with information regarding the amount of printing supplies currently available in the printing system.

SUMMARY OF THE INVENTION

In one embodiment of the present invention, a graphical user interface for providing operating information of a printing system on a display screen comprises a depiction of a printing system shown on the display screen including icons of at least one feeder, print engine and finisher, and a display unit displaying operator information of a desired icon on the display screen by selecting the desired icon. A desired icon is selected by pointing a cursor at the desired icon and keying a mouse or a key on the keyboard to select the desired icon. The desired icon may also be selected by highlighting a desired icon and keying a mouse or a key on the keyboard to select the desired icon. The graphical user interface further comprises a multiuse job progress indicator, including total time, elapsed time and time remaining for a current print job, shown on the display screen. The graphical user interface further comprises depiction of a pathway access window. The operator information comprises a depiction of different toners available to the printing system, a depiction of magnification, a depiction of registration information, a depiction of tray information, and a depiction of finisher information. The operator information further comprises a depiction of stacker information, inserter information, a depiction of stapler information, and a depiction of binder information.

In one embodiment of a printing system, the printing system prints image data received from a computer network, scanner or other image data generating device on a support material. The printing system comprises: a supply unit having a plurality of feeders, wherein each feeder has at least one tray for storing support material; a controller including a system controller processing the received image data, and a user interface comprising a depiction of a printing system shown on the display screen including icons of at least one feeder, print engine and finisher, and a display unit displaying operator information of a desired icon on the display screen by selecting the desired icon; a print engine including a charging unit charging a surface of a photoconductive belt, a first exposure unit exposing a photoconductive belt to create an electrostatic latent image based on the received image data at the direction of the system controller, a first developer unit having first color charged toner particles, which are attracted to the electrostatic latent image, a second exposure unit exposing the photoconductive belt based on the received image data at the direction of the system controller, a second developer unit having second color charged toner particles, which are attracted to the electrostatic latent image, a third exposure unit exposing the photoconductive belt based on the received image data at the direction of the system controller, a third developer unit having third color charged toner particles, which are attracted to the electrostatic latent image, a fourth exposure unit exposing the photoconductive belt based on the received image data at the direction of the system controller, a fourth developer unit having fourth charged toner particles, which are attracted to the electrostatic latent image, a transfer unit receiving support material and transferring the toner from the photoreceptor belt to the support material, a fuser assembly receiving the support material from the transfer unit and permanently affixing the toner to the sheet of support material, and a cleaning unit cleaning the photoreceptor belt; and a finishing unit, coupled to the print engine, the finishing unit comprising at least one of a stacker, binder, stapler and inserter.

In another embodiment of a printing system, the printing system prints image data received from a computer network, scanner or other image data generating device on a support material. The printing system comprises: a supply unit having a plurality of feeders, wherein each feeder has at least one tray for storing support material; a controller including a system controller processing the received image data, and a user interface comprising a depiction of a printing system shown on the display screen including icons of at least one feeder, print engine and finisher, and a display unit displaying operator information of a desired icon on the display screen by selecting the desired icon; a print engine including a charging unit charging a surface of a photoconductive belt, at least one exposure unit exposing a photoconductive belt to create an electrostatic latent image based on the received image data at the direction of the system controller, at least one developer unit having charged toner particles, which are attracted to the electrostatic latent image, a transfer unit receiving support material and transferring the toner from the photoreceptor belt to the support material, a fuser assembly receiving the support material from the transfer unit and permanently affixing the toner to the sheet of support material, and a cleaning unit cleaning the photoreceptor belt; and a finishing unit, coupled to the print engine, the finishing unit comprising at least one of a stacker, binder, stapler and inserter.

DETAILED DESCRIPTION OF THE PRESENT INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined in the appended claims.

Figure 1:
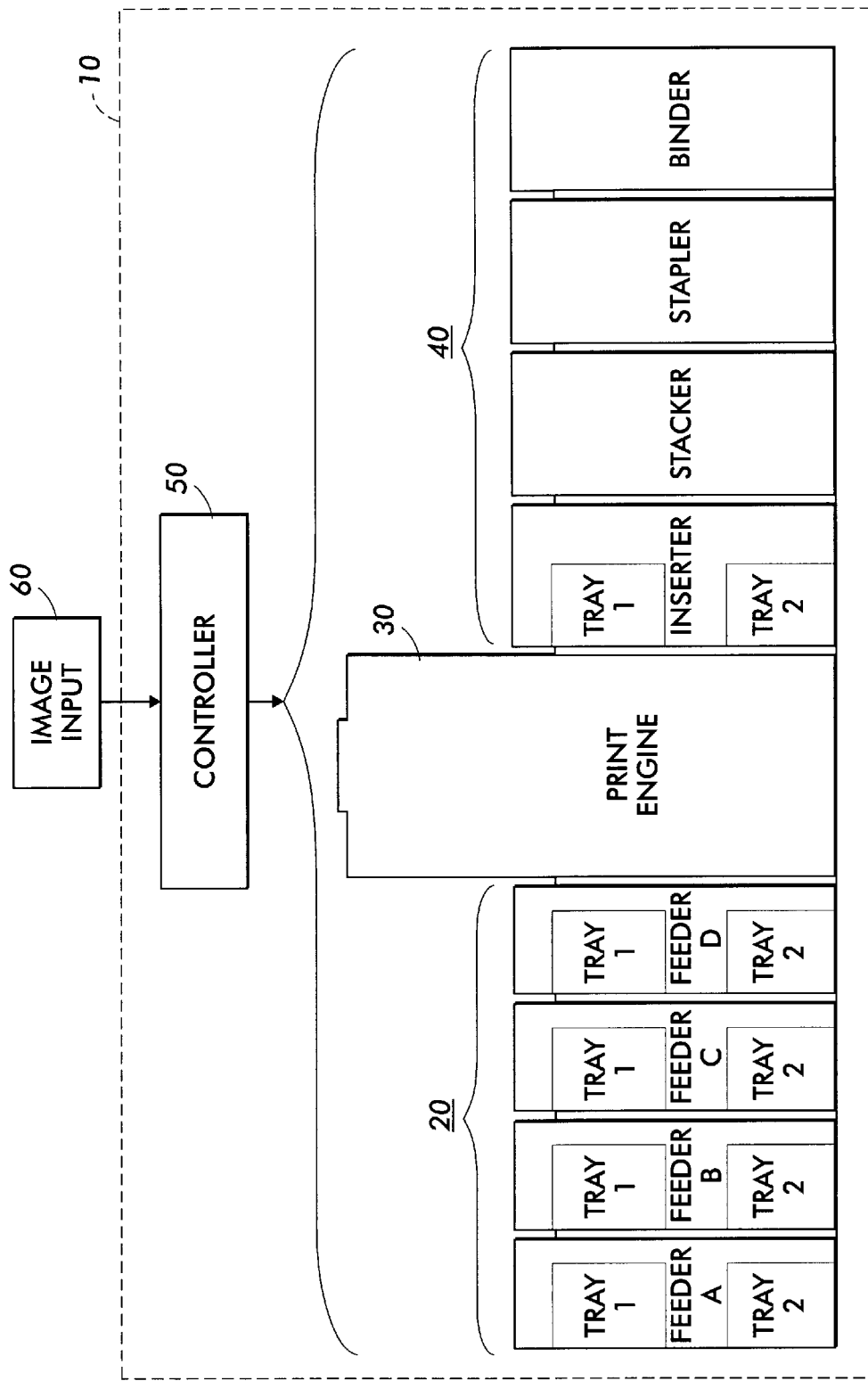
FIG. 1 shows a digital printing system into which the preferred embodiments may be incorporated.

FIG. 1 shows a digital printing system 10 of the type suitable for use with the preferred embodiment for processing print jobs. As shown, the digital printing system includes document feeders 20, a print engine 30, and finishers 40 and controller 50. The digital printing system 10 is coupled to an image input section 60.

Figure 2:
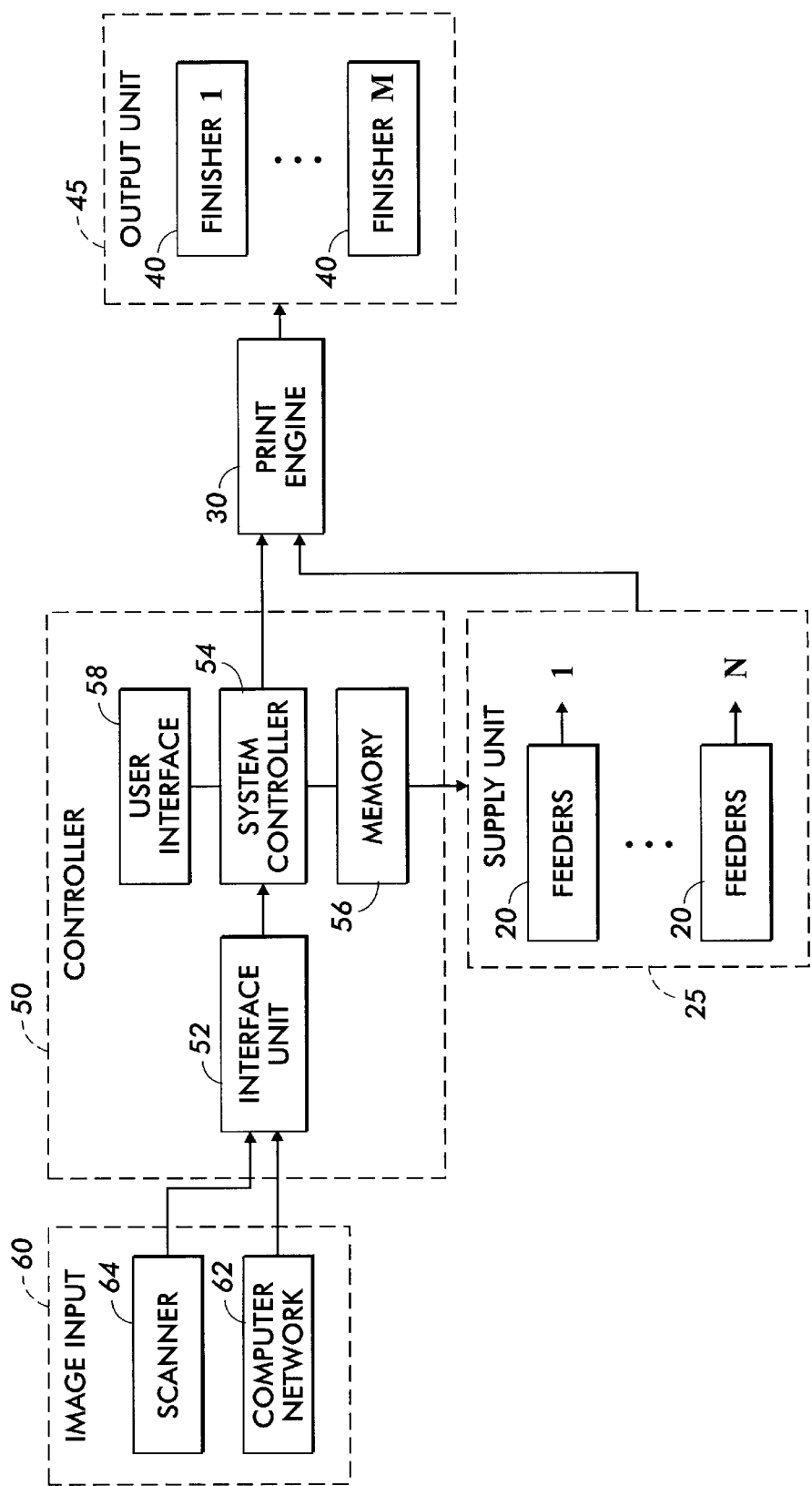
FIG. 2 is a general block diagram of the printing system shown in FIG. 1.

As shown in FIG. 2, the image input section 60 transmits signals to the controller 50. In the example shown, image input section 60 has both remote and onsite image inputs, enabling the digital printing system 10 to provide network, scan and print services. In this example, the remote image input is a computer network 62, and the onsite image input is a scanner 64. However, the digital printing system 10 can be coupled to multiple networks or scanning units, remotely or onsite. Other systems can be envisioned such as stand alone digital printing system with on-site image input, controller and printer. While a specific digital printing system is shown and described, the present invention may be used with other types of printing systems such as analog printing systems.

The digital printing system 10 can receive image data, which can include pixels, in the form of digital image signals for processing from the computer network 62 by way of a suitable communication channel, such as a telephone line, computer cable, ISDN line, etc. Typically, computer networks 62 include clients who generate jobs, wherein each job includes the image data in the form of a plurality of electronic pages and a set of processing instructions. In turn, each job is converted into a representation written in a page description language (PDL) such as PostScript® containing the image data. Where the PDL of the incoming image data is different from the PDL used by the digital printing system, a suitable conversion unit converts the incoming PDL to the PDL used by the digital printing system. The suitable conversion unit may be located in an interface unit 52 in the controller 50. Other remote sources of image data such as a floppy disk, hard disk, storage medium, scanner, etc. may be envisioned.

For on-site image input, an operator may use the scanner 64 to scan documents, which provides digital image data including pixels to the interface unit 52. Whether digital image data is received from scanner 64 or computer network 62, the interface unit 52 processes the digital image data in the form required to carry out each programmed job. The interface unit 52 is preferably part of the digital printing system 10. However, the computer network 62 or the scanner 64 may share the function of converting the digital image data into a form, which can be unutilized by the digital printing system 10.

As indicated previously, the digital printing system 10 includes one or more (1 to N) feeders 20, a print engine 30, one or more (1 to M) finishers 40 and a controller 50. Each feeder 20 preferably includes one or more trays, which forward different types of support material to the print engine 30. All of the feeders 20 in the digital printing system 10 are collectively referred to as a supply unit 25. All of the finishers 40 are collectively referred to as an output unit 45. The output unit 45 may comprise several types of finishers 40 such as inserters, stackers, staplers, binders, etc., which take the completed pages from the print engine 30 and use them to provide a finished product.

Figure 3:
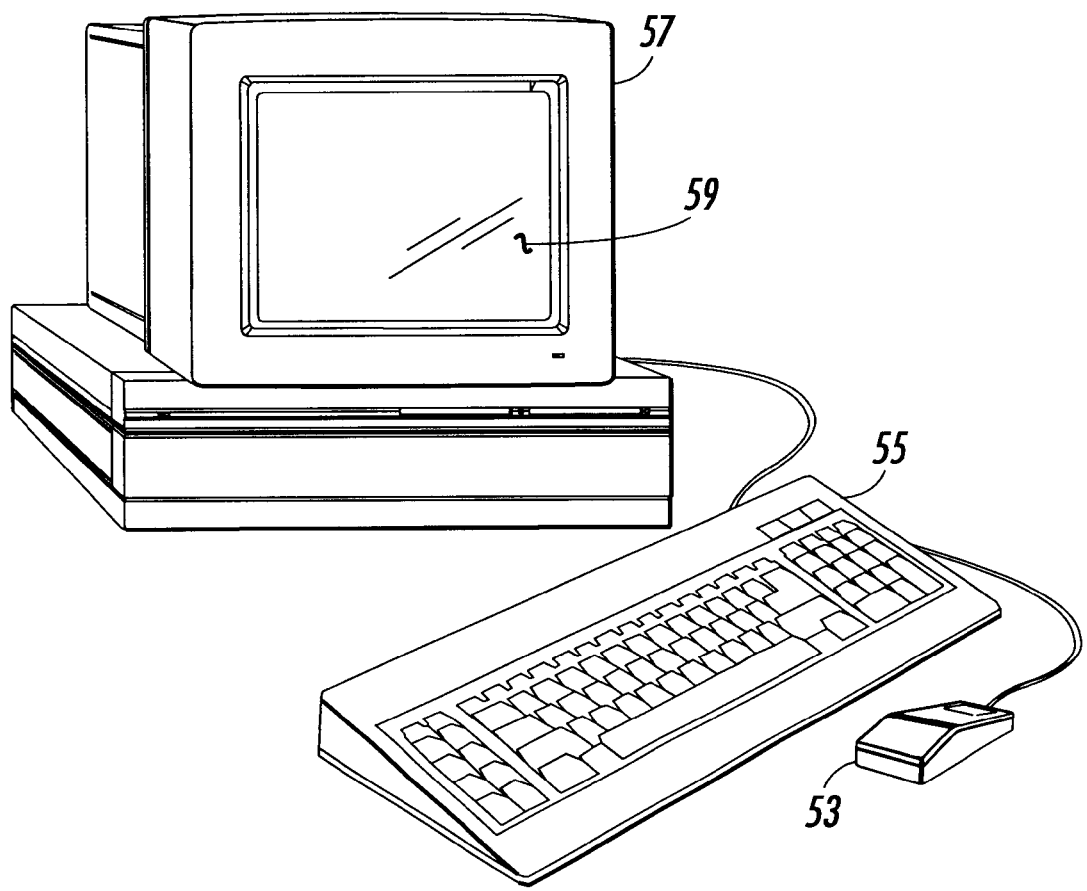
FIG. 3 is a general diagram of a few of the components of the user interface shown in FIG. 2.

The controller 50 controls and monitors the entire digital printing system 10 and interfaces with both on-site and remote input units in the image input section 60. The controller 50 includes the interface unit 52, a system control unit 54, a memory 56 and a user interface 58. The system control unit 54 receives print engine information from sensors throughout the digital printing system 10. The user interface 58 includes an area holding a graphic representation or picture of the feeders 20, print engine 30 and finishers of the digital printing system 10. The user interface 58 permits an operator to monitor the document feeders 20, print engine 30 and finishers 40 by navigating through a series of menus by highlighting, clicking, double-clicking, etc. on a section or otherwise opening a section of the graphical representation of the user interface 58 to reach controls or information related to that component of the digital printing system 10. Therefore, a user (also called an operator) can associate tasks done on the user interface 58 with their physical location on the digital printing system 10 and thereby enable faster and more intuitive navigation. The user interface 58 preferably includes at least a mouse 53, a keyboard 55 and a display unit 57 as shown in FIG. 3. The display unit 57 has a display screen 59.

Figure 4:
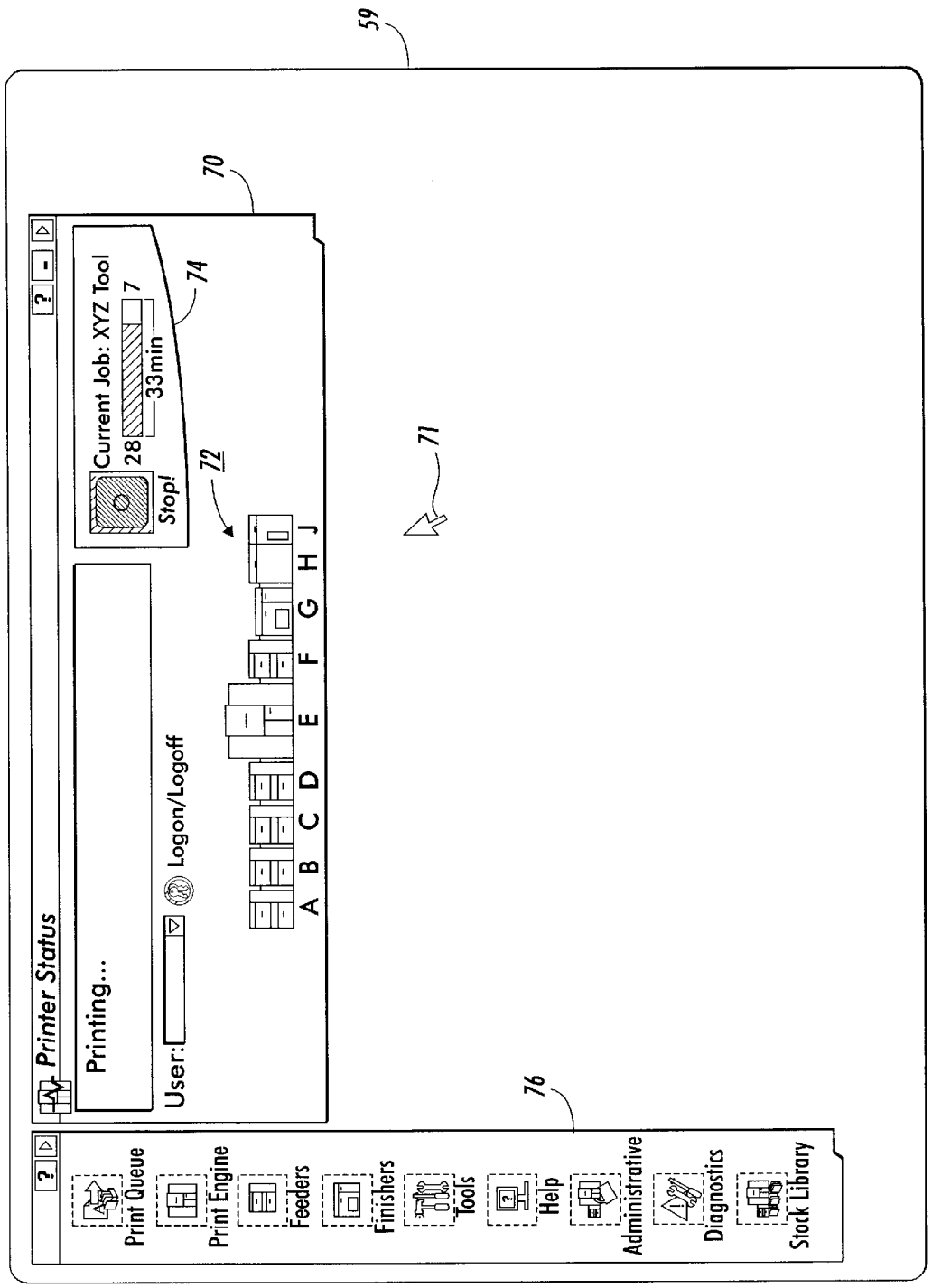
FIG. 4 is a view depicting an exemplary graphical representation of printer status window and pathway access window displayed on a user interface screen of the printing system shown in FIGS. 1 and 2.

FIGS. 4–17 show a series of menus and graphical representations displayed on a display screen 59, which are used to reach controls or information related to components or supplies in the digital printing system 10. FIG. 4 shows a printer status window 70 having a printer icon 72 including feeder icons A–D, print engine icon E, and finisher icons F–J. However, as indicated above, feeder icons and finisher icons can be added or removed so that the printer icon 72 is an accurate depiction of the printing system actually being used by the operator. The printer status window 70 also includes a job progress meter 74, which continuously informs the operator of the total time required to complete a print job (e.g. 33 minutes), the time that has elapsed since the print job began (e.g. 28 minutes) and the time remaining (7 minutes). This enables the operator to make choices as to whether to stop or suspend the current job in order to process a higher priority job. FIG. 4 also shows a pathway access window 76, which also provides access to information and control of the digital printing system 10.

Figure 5:
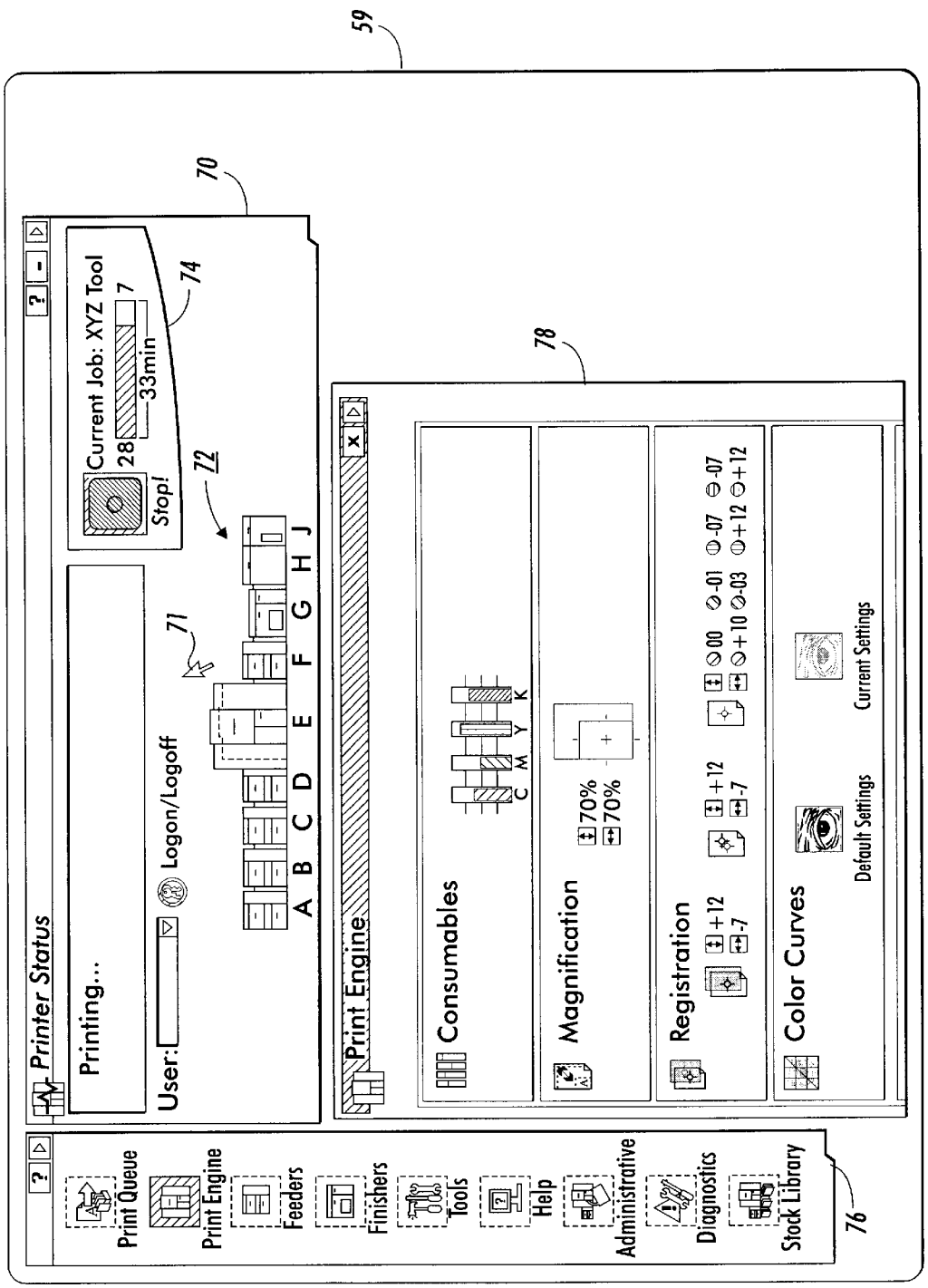
FIG. 5 is a view depicting an exemplary graphical representation of print engine settings and supplies displayed on a user interface screen of the printing system shown in FIGS. 1 and 2.
Figure 6:
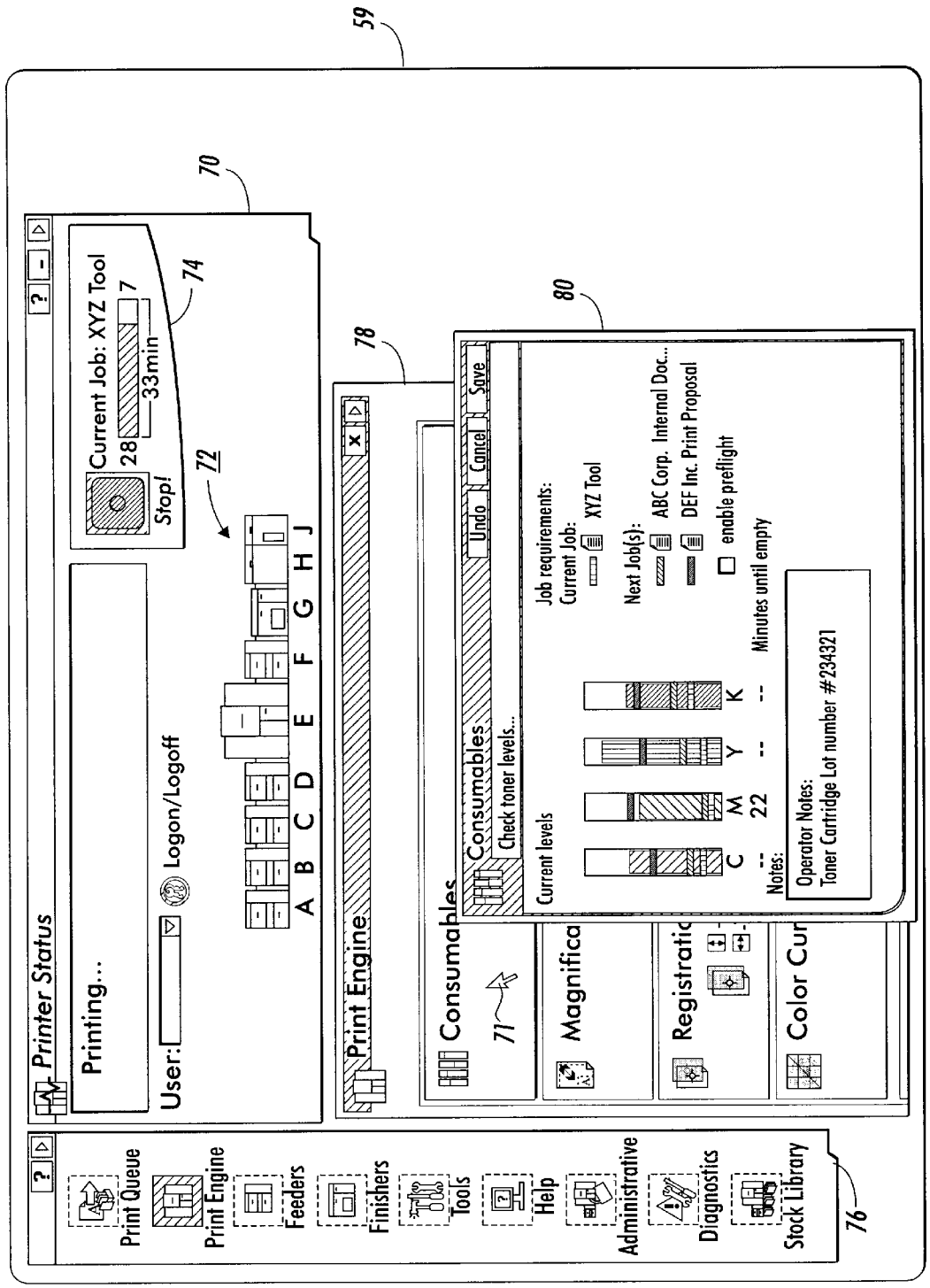
FIG. 6 is a view depicting an exemplary graphical representation of print engine consumables displayed on a user interface screen of the printing system shown in FIGS. 1 and 2.
Figure 7:
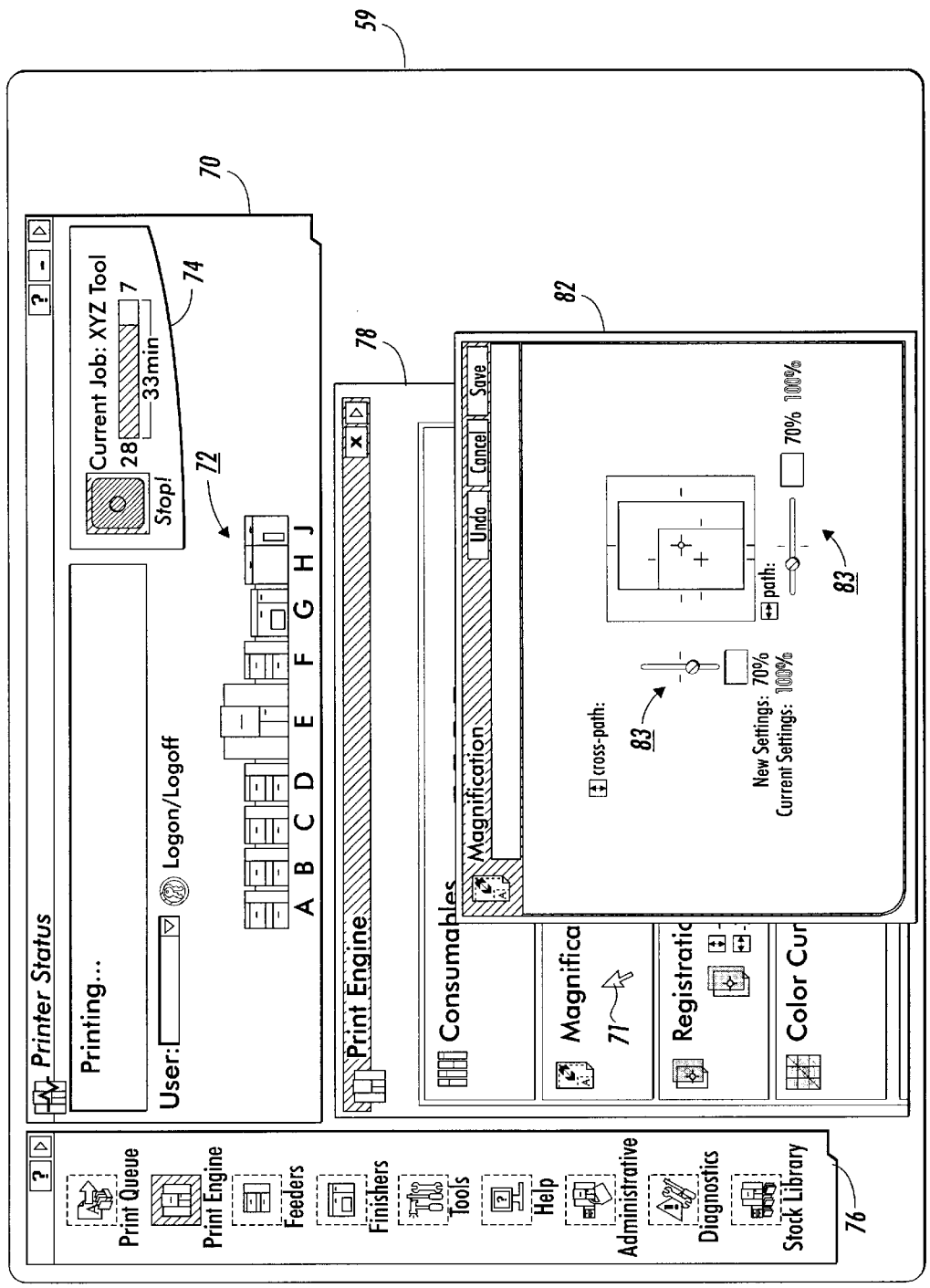
FIG. 7 is a view depicting an exemplary graphical representation of magnification settings displayed on a user interface screen of the printing system shown in FIGS. 1 and 2.
Figure 8:
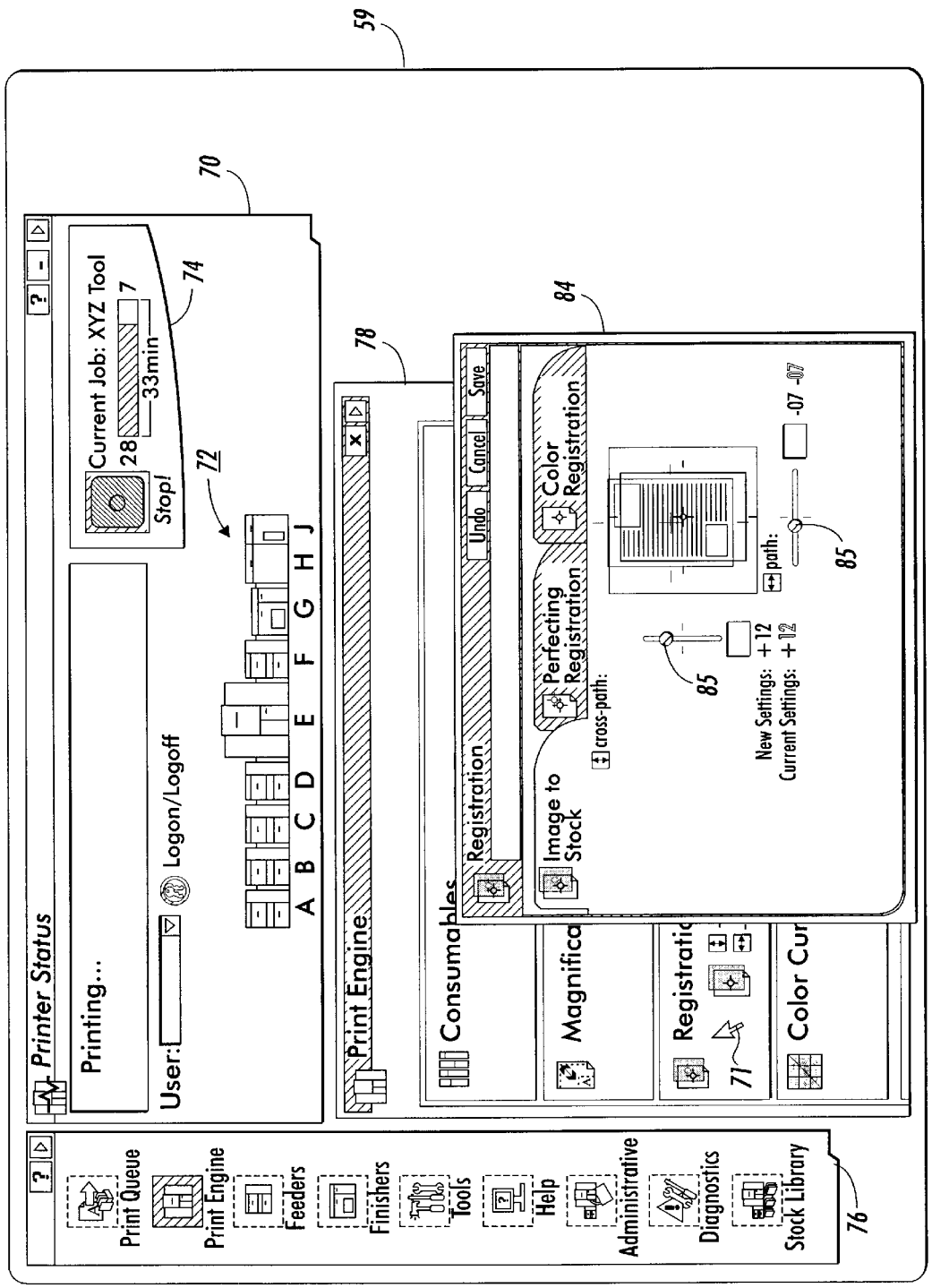
FIG. 8 is a view depicting an exemplary graphical representation of image to stock registration settings displayed on a user interface screen of the printing system shown in FIGS. 1 and 2.
Figure 9:
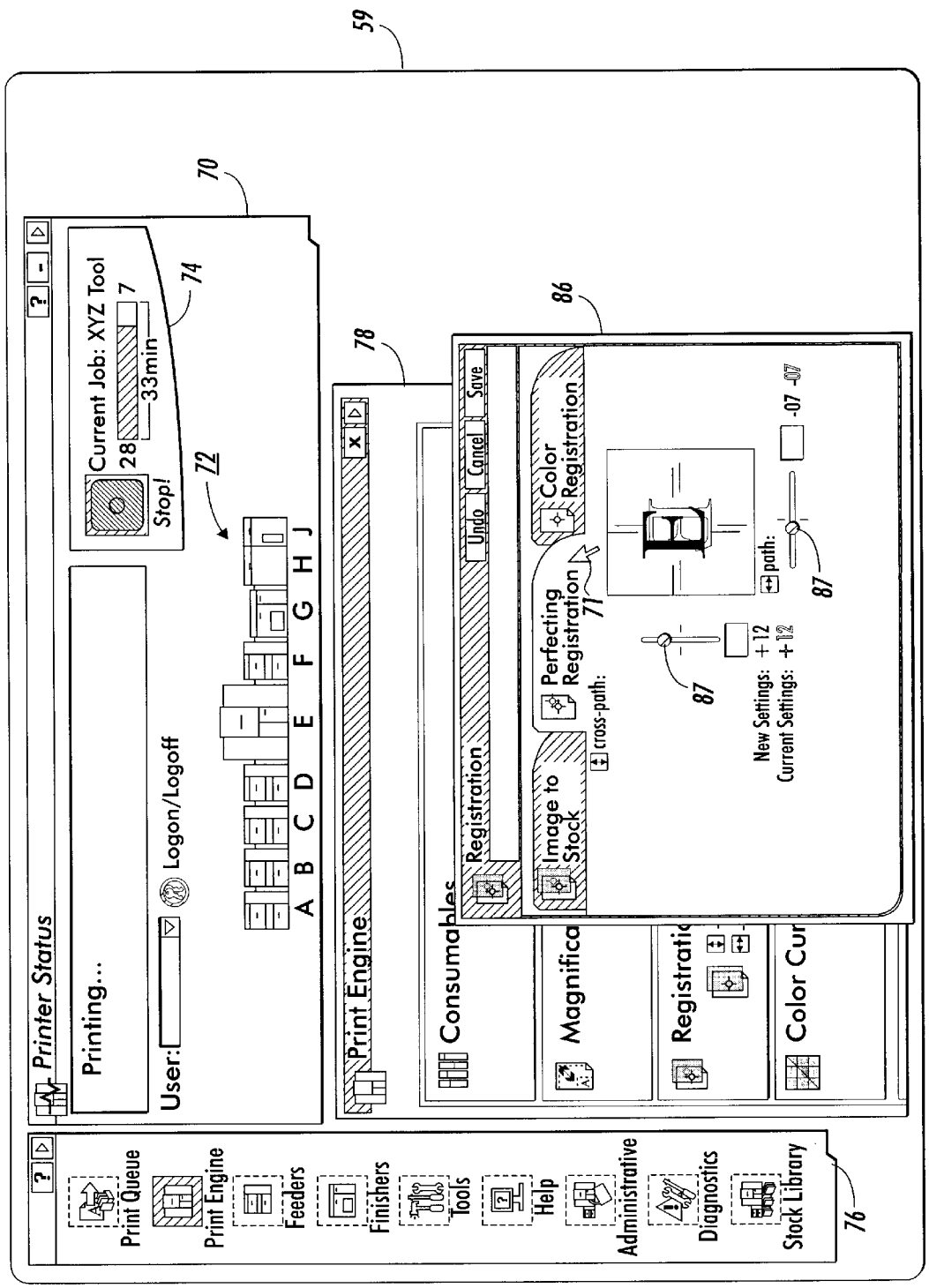
FIG. 9 is a view depicting an exemplary graphical representation of perfecting registration displayed on a user interface screen of the printing system shown in FIGS. 1 and 2.
Figure 10:
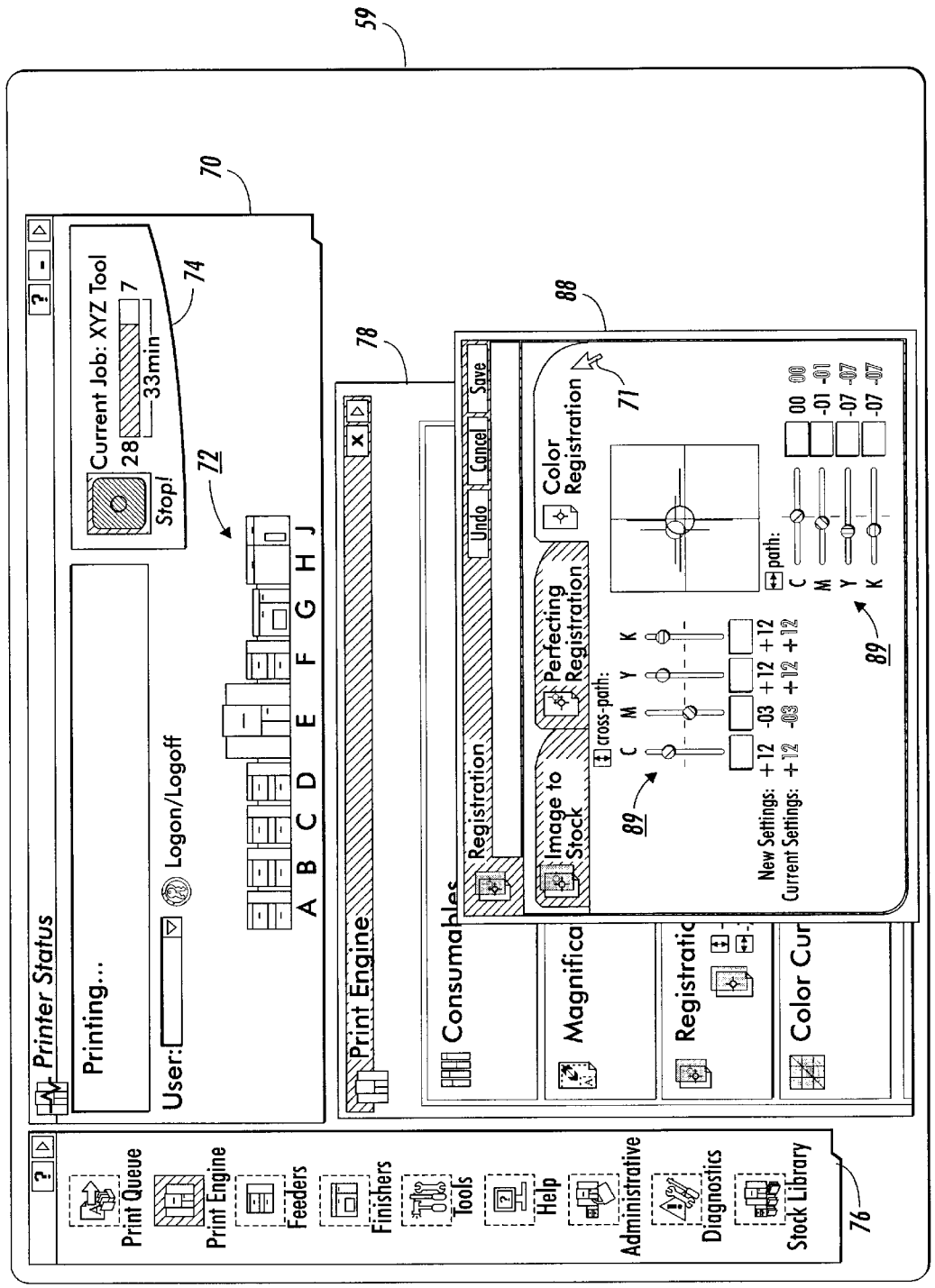
FIG. 10 is a view depicting an exemplary graphical representation of color registration displayed on a user interface screen of the printing system shown in FIGS. 1 and 2.

By highlighting and then clicking on the print engine icon E of the printer status window 70 or by clicking on the print engine icon/button of the pathway access window 76, print engine information 78 is displayed as shown in FIG. 5. The print engine information is a summary of the current amount of consumables such as toner as well as the current magnification, registration and color curve settings. By clicking on consumables, more detailed consumable information 80 regarding the current toner levels in the print engine 30 are displayed as shown in FIG. 6. This window shows the user the current toner levels and the amount needed by each job in the print ready queue. The system alerts the user that it will run out of toner if all the jobs currently in the print ready queue combined require more toner than is currently available. Magenta is an example of this situation. All the jobs in the queue combined require more magenta toner than is available, so in 22 minutes, the system will halt. After clicking on magnification, more detailed magnification information and controls 82 are displayed as shown in FIG. 7. By moving the slider control 84, the operator can adjust the magnification of the printed image on the support material. By clicking on registration, the operator can access more detailed information and controls on image to stock, perfecting registration, and color registration as shown in FIGS. 8–10. The image to stock tab houses controls that allow the user to adjust the position (both vertically or horizontally) of a printed image on the front side of a page. The perfecting registration tab holds controls which allow the user to adjust the position (both vertically or horizontally) of a printed image on the back side of the page to line up with the image printed on the front of the page when two-sided printing is enabled. The color registration tab houses controls enabling the user to adjust the relative positions of each color individually on a page (e.g. cyan, magenta, yellow, and black) either horizontally or vertically.

Figure 11:
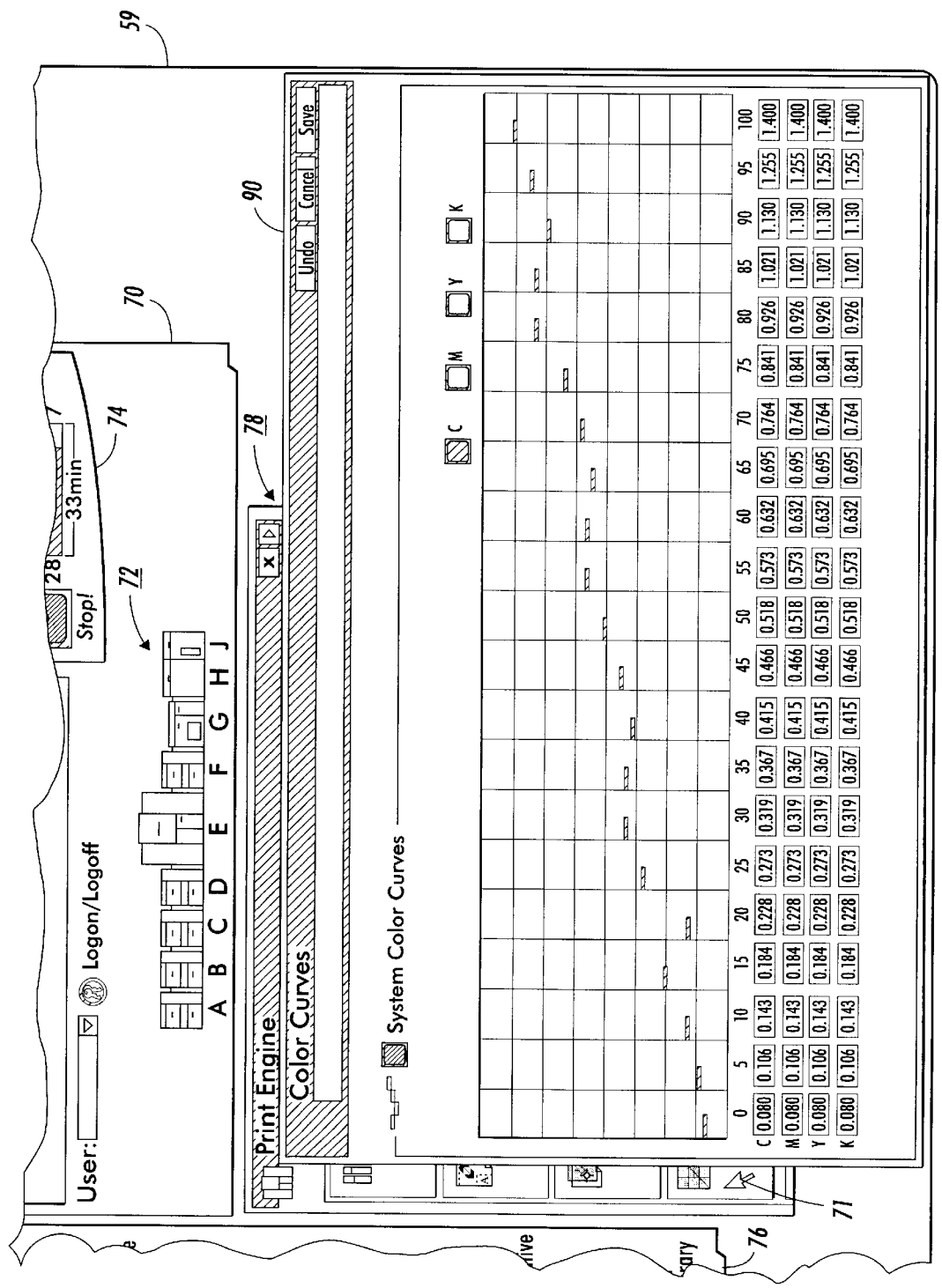
FIG. 11 is a view depicting an exemplary graphical representation of color curves displayed on a user interface screen of the printing system shown in FIGS. 1 and 2.

FIG. 11 shows system color curves, which indicate the toner density applied to the electrostatic latent image and subsequently permanently affixed to support material.

Figure 12:
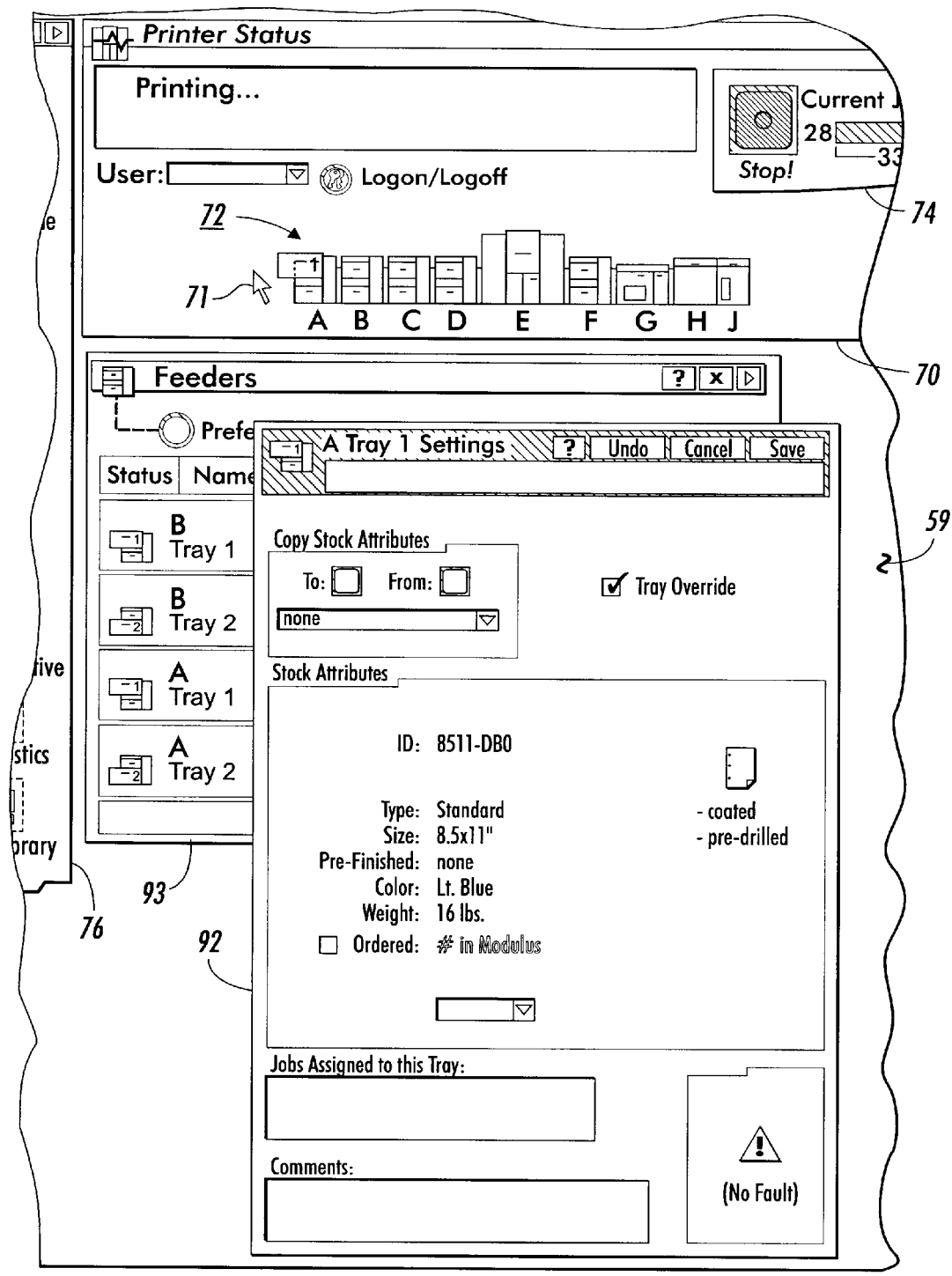
FIG. 12 is a view depicting an exemplary graphical representation of tray information of a feeder displayed on a user interface screen of the printing system shown in FIGS. 1 and 2.
Figure 13:
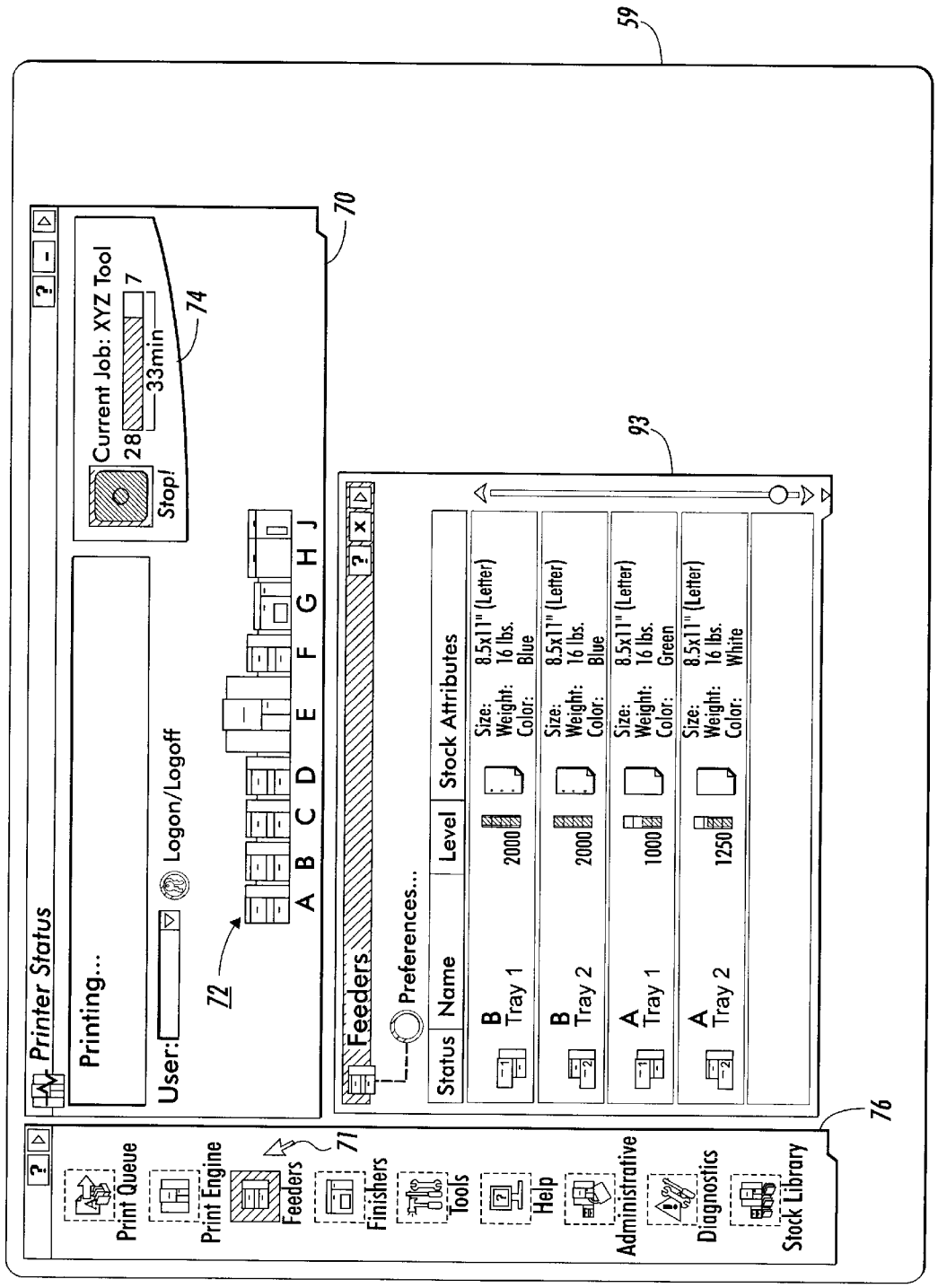
FIG. 13 is a view depicting an exemplary graphical representation of feeders displayed on a user interface screen of the printing system shown in FIGS. 1 and 2.
Figure 14:
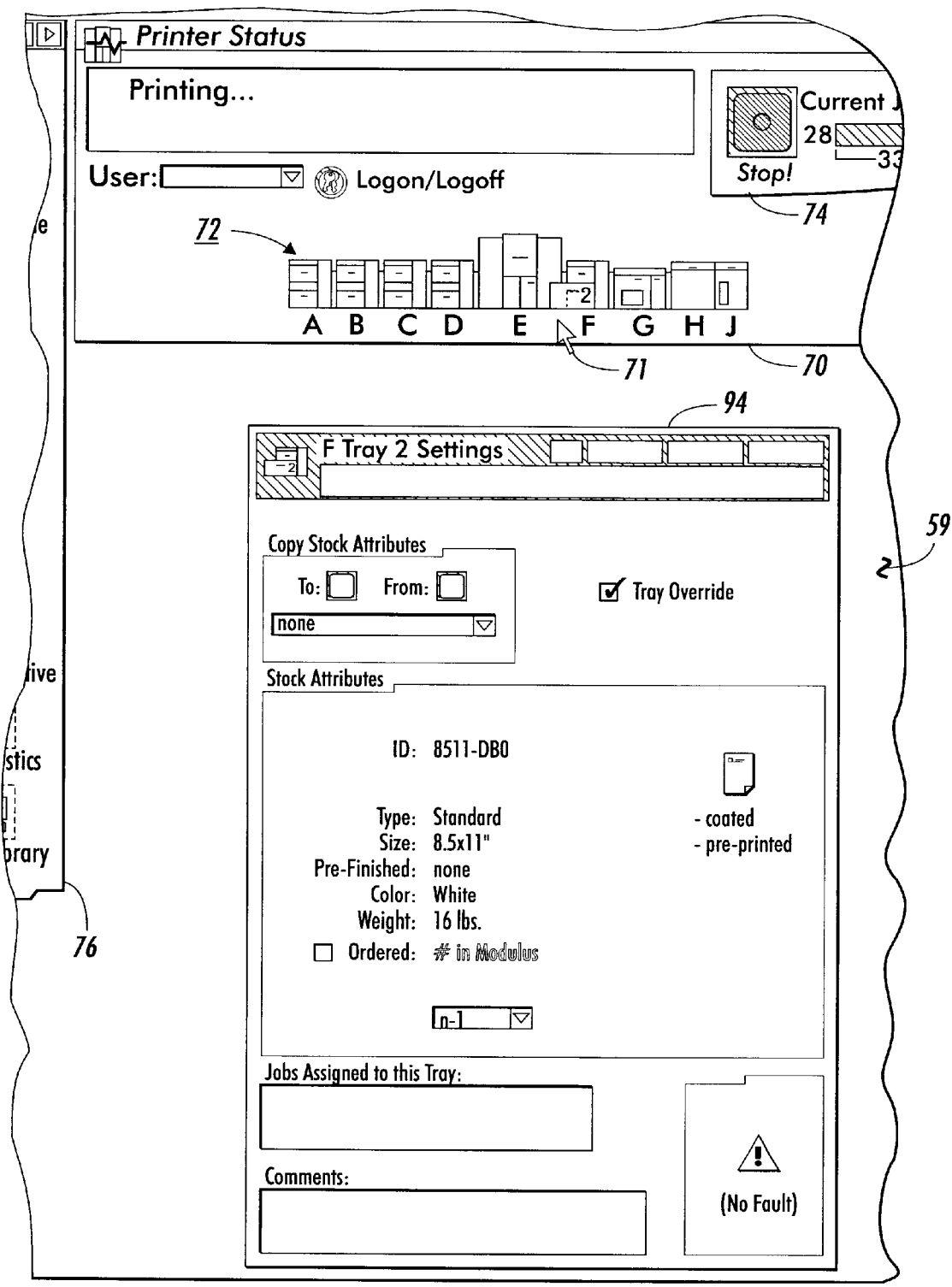
FIG. 14 is a view depicting an exemplary graphical representation of finisher tray information of an inserter displayed on a user interface screen of the printing system shown in FIGS. 1 and 2.
Figure 15:
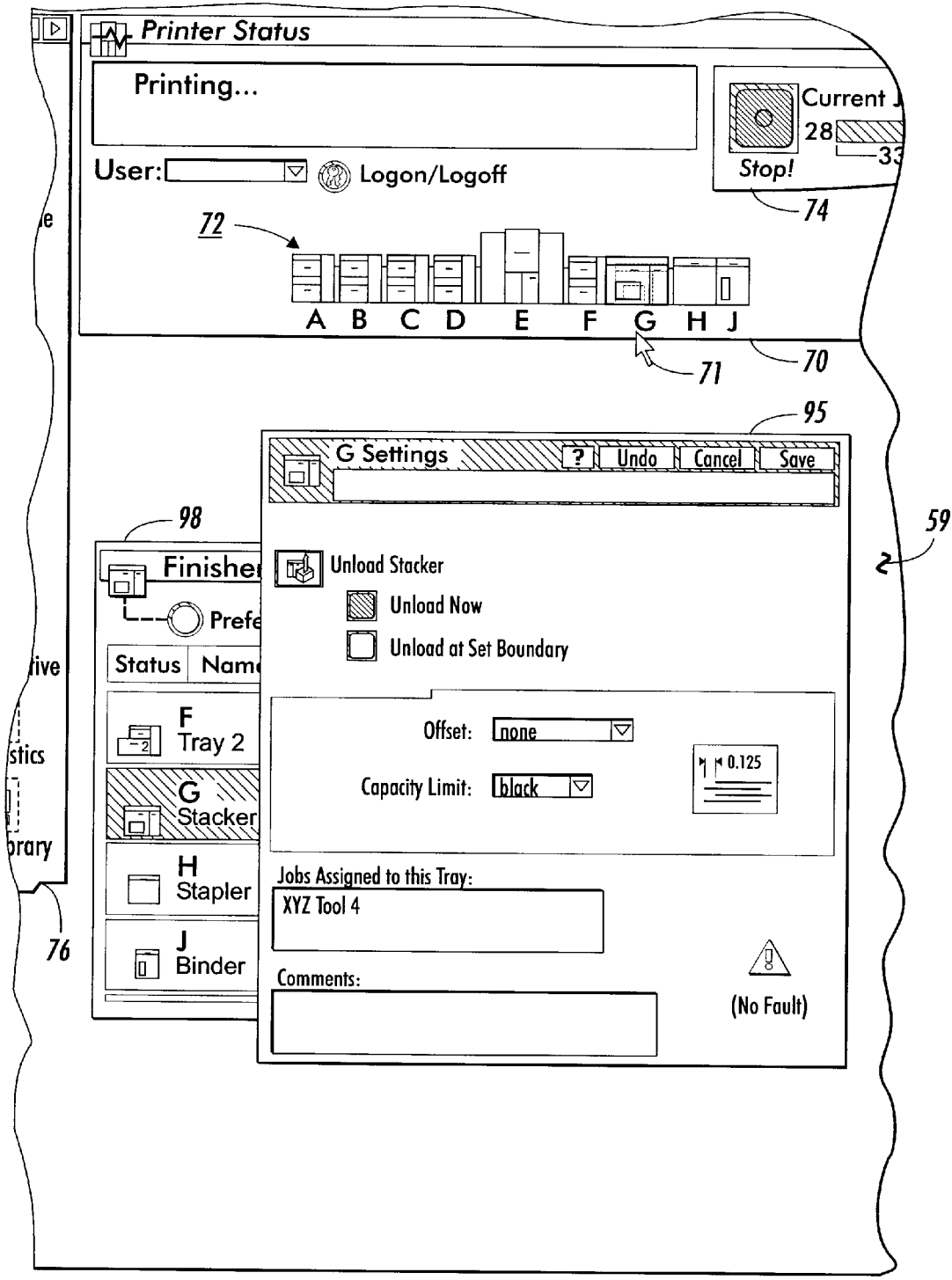
FIG. 15 is a view depicting an exemplary graphical representation of stacker information displayed on a user interface screen of the printing system shown in FIGS. 1 and 2.
Figure 16:
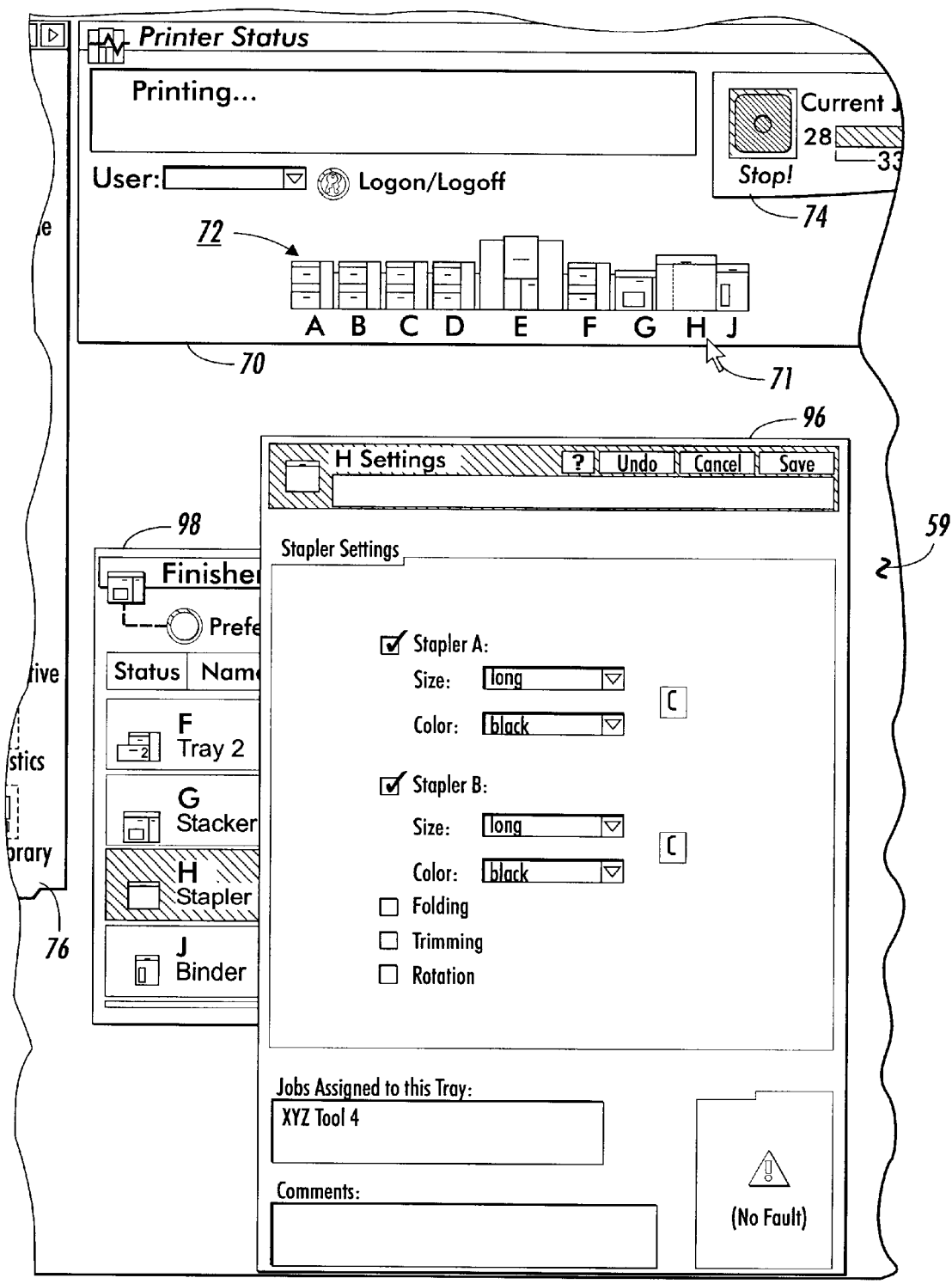
FIG. 16 is a view depicting an exemplary graphical representation of stapler information displayed on a user interface screen of the printing system shown in FIGS. 1 and 2.
Figure 17:
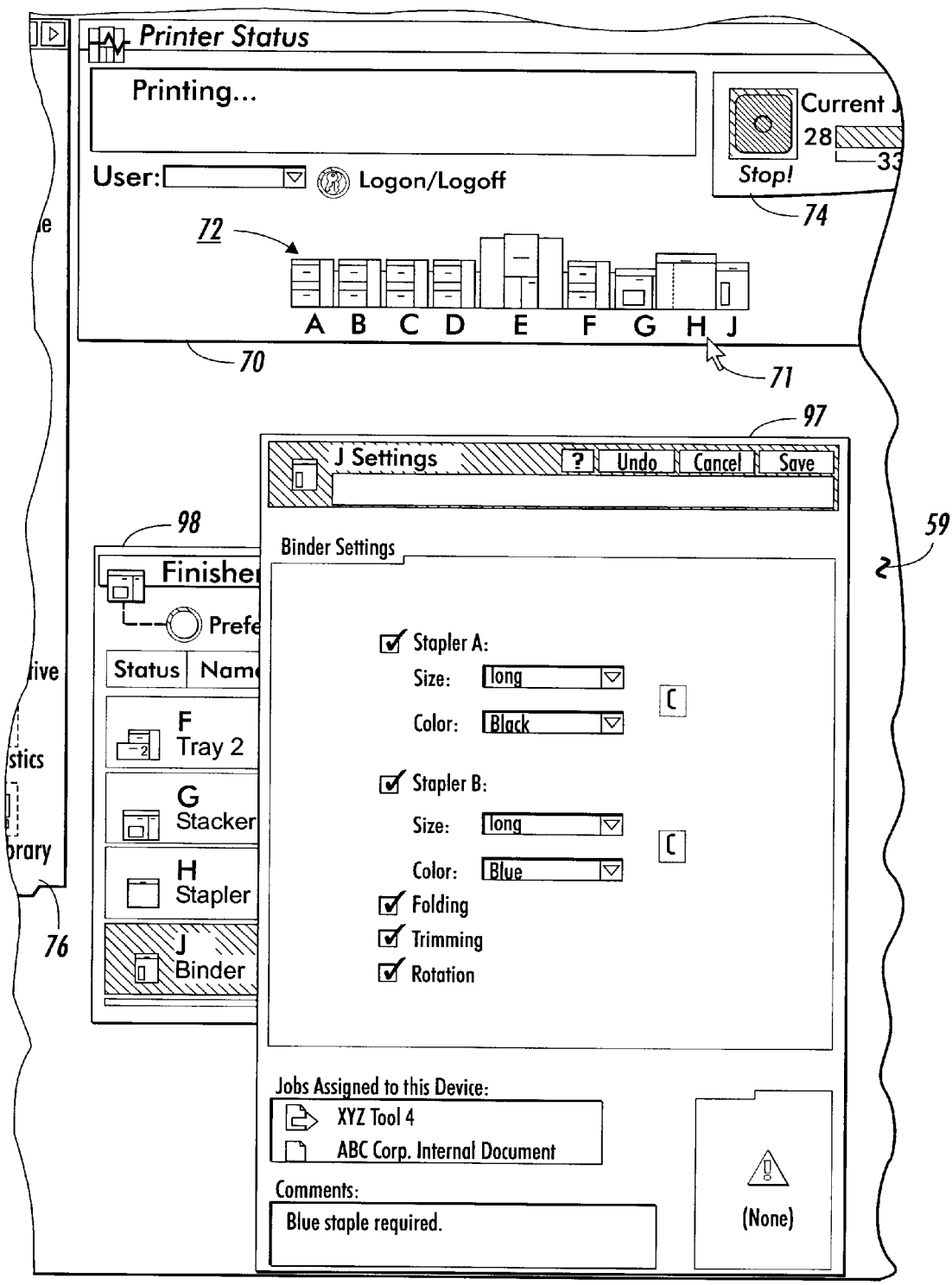
FIG. 17 is a view depicting an exemplary graphical representation of binder information displayed on a user interface screen of the printing system shown in FIGS. 1 and 2.
Figure 18:
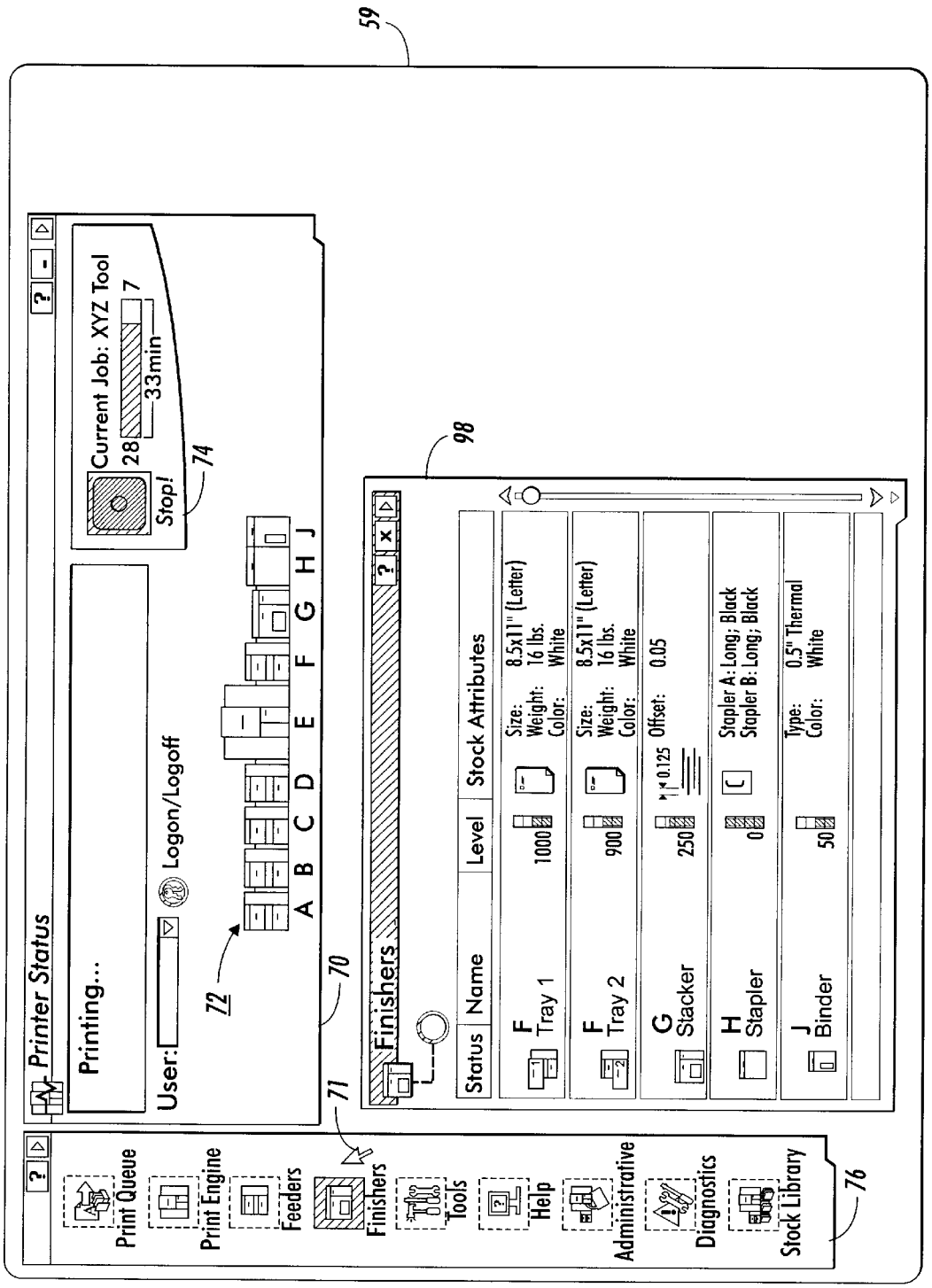
FIG. 18 is a view depicting an exemplary graphical representation of finisher information displayed on a user interface screen of the printing system shown in FIGS. 1 and 2.

As indicated above, an operator can monitor the feeders 20 by highlighting and then clicking on a tray of a feeder as shown in FIG. 12. FIG. 12 shows a display of feeder A tray 1 information 92, which provides the attributes of the support material or stock currently in tray 1 of feeder A. The operator can change the type of stock contained in the tray from here and also turn the tray override setting on or off. A brief summary of the stock attributes in each tray of each feeder is displayed by clicking on feeders in the pathway access window 76 as shown in FIG. 13. Similarly, an operator can monitor finishers 40 by highlighting and then clicking on a finisher 40, for example a tray 2 of inserter F as shown in FIG. 14. FIG. 14 shows a display of inserter F tray 2 information 94, which provides the attributes of the support material or stock currently in tray 1 of inserter F. An inserter F inserts preprinted material as needed to complete a job The operator can change the type of stock contained in the tray from here and also turn the tray override setting on or off. By highlighting and clicking on stacker G, stapler H or binder I, stacker information 95, stapler information 96, and binder information 97 is displayed as shown in FIGS. 15, 16 and 17 respectively. The operator can change some settings within these windows. In the settings window for stacker G, the operator can use the unload button and adjust offset and capacity limit settings. In the settings window for the stapler and binder (H and I), settings can be entered for the staple color and type. Further, folding, trimming, and rotation options can be turned on or off. A brief summary of the finisher information 98 of each finisher 40 is displayed by clicking on the finishers icon/button in the pathway access window 76 as shown in FIG. 18.

Figure 19:
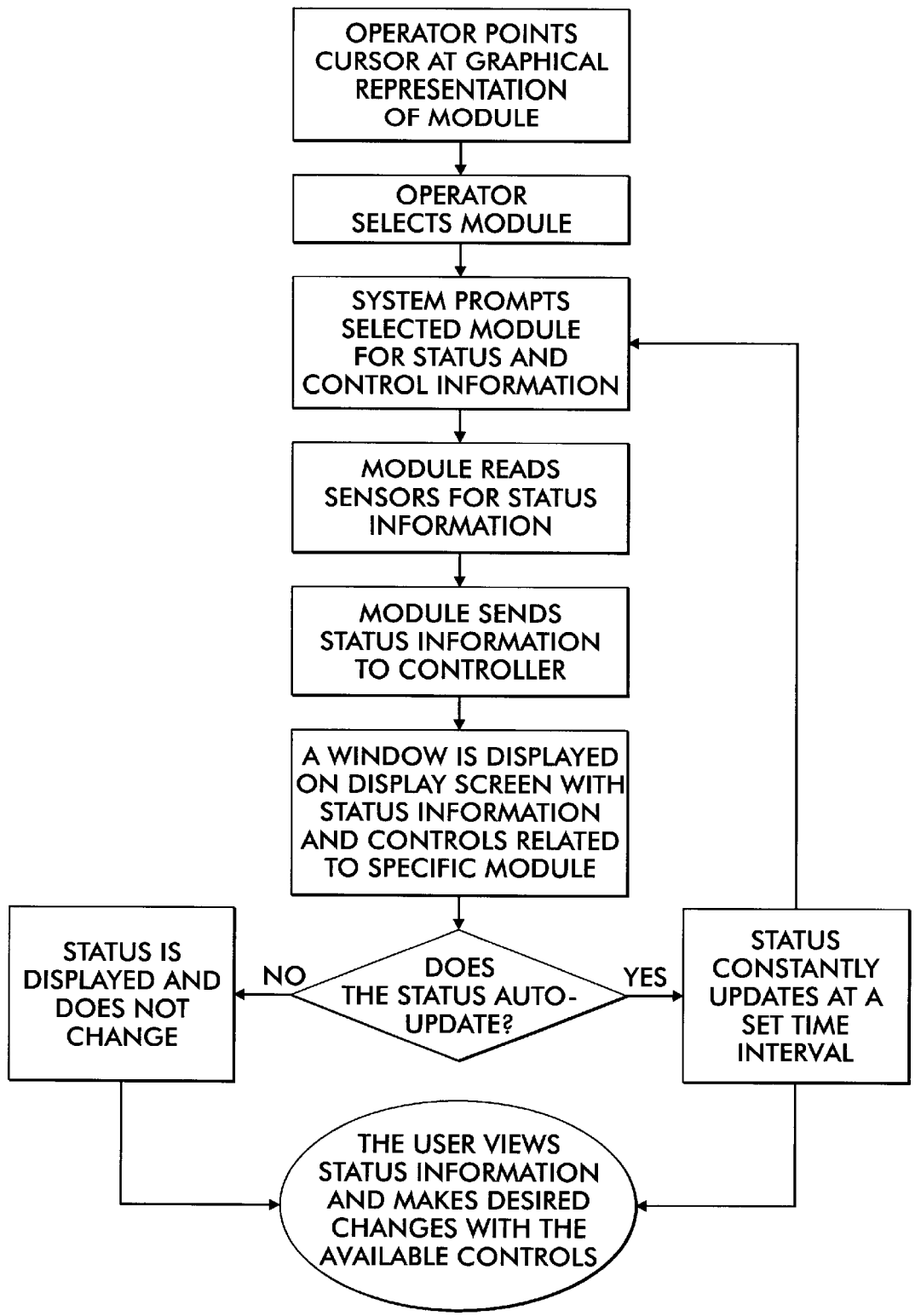
FIG. 19 is a flow chart showing the process of accessing information.

FIG. 19 shows one example of accessing information and controls. An operator points the cursor 71 over a section of the printer icon 72, which represents one of the modules of the digital printing system 10. The operator then clicks, double clicks or otherwise commands the controller 50 to prompt the selected module such as the print engine 30, a feeder 20 or finisher 40 for status information. Sensors in each module send status information to the controller 50, which is then displayed on display screen 59 in the window along with controls relating to the specific module. Toner and magnification controls are just two examples. Some of the modules continuously send status information at predetermined time intervals to the controller 50, and the user interface 58 updates the information appearing on the display screen 59. Some of the status information does not change unless the operator changes the information, e.g. magnification. The operator can now view current status information and also control the module by way of the user interface 58 in controller 50.

Figure 20:
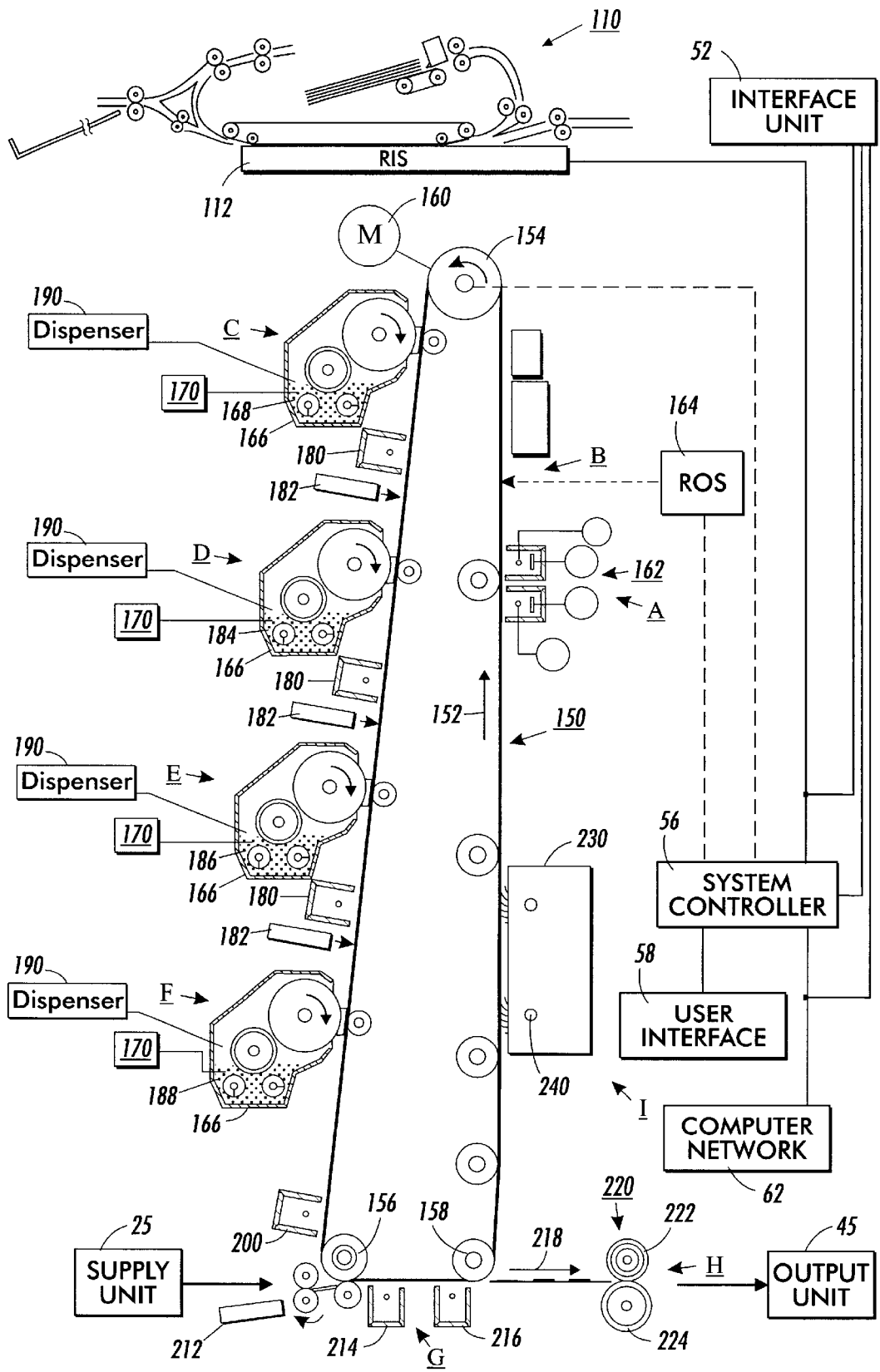
FIG. 20 is a partial schematic elevational view of an example of a printing system employing the user interface of the present invention.

FIG. 20 is a partial schematic view of a digital printing system, such as the digital imaging system of U.S. application Ser. No. 09/318,953, utilizing the navigation and control user interface of the present invention. The imaging system is used to produce color output in a single pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, a single or multiple pass highlight color system and a black and white printing system. The present invention is applicable to a printing system having a print engine with any number of developer housings.

In one embodiment, an original document can be positioned in a document handler 110 on a raster-input scanner (RIS) indicated generally by reference numeral 112. However, as shown in FIG. 2, any scanner 64 can be utilized. The RIS 112 capture the entire original document and converts it to a series of raster scan lines or image signals. This information is transmitted to an electronic subsystem (ESS) or system controller 54 by way of interface unit 52. System controller 54 includes a pixel counter, and is connected to a user interface 58. Alternatively, image signals may be supplied by a computer network 62 by way of interface unit 52.

The print engine preferably uses a charge retentive surface in the form of an Active Matrix (AMAT) photoreceptor belt 150 supported for movement in the direction indicated by arrow 152, for advancing sequentially through the various xerographic process stations. The photoreceptor belt 150 is entrained about a drive roller 154, tension rollers 156 and fixed roller 158 and the drive roller 154 is operatively connected to a drive motor 160 for effecting movement of the photoreceptor belt 150 through the xerographic stations. A portion of photoreceptor belt 150 passes through charging station A where a corona generating device, indicated generally by the reference numeral 162, charges the photoconductive surface of photoreceptor belt 150 to a relatively high, substantially uniform, preferably negative potential.

Next, the charged portion of photoconductive surface is advanced through an imaging/exposure station B. At imaging/exposure station B, the system controller 54 receives the image signals from raster input scanner 66 by way of the interface unit 52. The image signals represent the desired output image. The system controller 54 processes these signals to convert them to the various color separations of the image which is transmitted to a laser based output scanning device, which causes the charge retentive surface to be discharged in accordance with the output from the scanning device. Preferably the laser based scanning device is a laser Raster Output Scanner (ROS) 164. Alternatively, the ROS 164 could be replaced by other xerographic exposure devices such as LED arrays. A computer network 62 may also transmit image signals to the system controller 54 by way of the interface unit 52.

The photoreceptor belt 150, which is initially charged to a voltage $V_0$, undergoes dark decay to a level equal to about −500 volts. When exposed at the exposure station B, it is discharged to a level equal to about −50 volts. Thus after exposure, the photoreceptor belt 150 contains a monopolar voltage profile of high and low voltages, the former corresponding to charged areas and the latter corresponding to discharged or background areas.

At a first development station C, developer structure, indicated generally by the reference numeral 166 utilizing a hybrid development system, the development roll, better known as the donor roll, is powered by two development fields (potentials across an air gap). The first field is the ac field which is used for toner cloud generation. The second field is the dc development field which is used to control the amount of developed toner mass on the photoreceptor belt 150. Preferably, the developer structure 166 contains magenta toner particles 168. The toner cloud causes charged magenta toner particles 168 to be attracted to the electrostatic latent image. Appropriate developer biasing is accomplished via a power supply. This type of system is a noncontact type in which only toner particles (magenta, for example) are attracted to the latent image and there is no mechanical contact between the photoreceptor belt 150 and a toner delivery device to disturb a previously developed, but unfixed, image. A toner concentration sensor 170 senses the toner concentration in the developer structure 166. A toner dispenser 190 adds new toner particles 168 to increase the toner concentration in the developer structure 166 at developer station C. The developed but unfixed image is then transported past a second charging device 180 where the photoreceptor belt 150 and previously developed toner image areas are recharged to a predetermined level.

A second exposure/imaging is performed by device 182. Device 182 preferably comprises a laser based output structure and is preferably utilized for selectively discharging the photoreceptor belt 150 on toned areas and/or bare areas, pursuant to the image to be developed with the second color toner.

Device 182 may be a raster output scanner or LED window. At this point, the photoreceptor belt 150 contains toned and untoned areas at relatively high voltage levels and toned and untoned areas at relatively low voltage levels. These low voltage areas represent image areas which are developed using discharged area development (DAD). To this end, a negatively charged, developer material 184 comprising color toner, preferably yellow, is employed. The toner, which by way of example may be yellow, is contained in a developer structure 166 disposed at a second developer station D and is presented to the latent images on the photoreceptor belt 150 by way of a second developer system. A power supply (not shown) serves to electrically bias the developer structure 166 to a level effective to develop the discharged image areas with negatively charged yellow toner particles 184. Further, a toner concentration sensor 170 senses the toner concentration in the developer structure 166. A toner dispenser 190 adds new toner particles 184 to increase the concentration in the developer structure 166 at developer station D.

The above procedure is repeated for a third image for a third suitable color toner such as cyan 186 (station E) and for a fourth image and suitable color toner such as black 188 (station F). The exposure control scheme described below may be utilized for these subsequent imaging steps. In this manner a full color composite toner image is developed on the photoreceptor belt 150. In addition, a permeability sensor 200 measures developed mass per unit area. Although only one mass sensor 200 is shown in FIG. 1, there may be more than one mass sensor 200.

To the extent to which some toner charge is totally neutralized, or the polarity reversed, thereby causing the composite image developed on the photoreceptor belt 150 to consist of both positive and negative toner, a negative pre-transfer dicorotron member 214 is provided to condition all of the toner for effective transfer to a substrate using positive corona discharge.

Subsequent to image development a sheet of support material 212 from supply unit 25 is moved into contact with the toner images at transfer station G. The sheet of support material 212 is advanced to transfer station G by the supply unit 25. The sheet of support material 212 is then brought into contact with photoconductive surface of photoreceptor belt 150 in a timed sequence so that the toner powder image developed thereon contacts the advancing sheet of support material 212 at transfer station G.

Transfer station G includes a transfer dicorotron 214 which sprays positive ions onto the backside of support material 212. This attracts the negatively charged toner powder images from the photoreceptor belt 150 to sheet 212. A detack dicorotron 216 is provided for facilitating stripping of the sheets from the photoreceptor belt 150.

After transfer, the sheet of support material 212 continues to move, in the direction of arrow 218, onto a conveyor (not shown) which advances the sheet to fusing station H. Fusing station H includes a fuser assembly, indicated generally by the reference numeral 220, which permanently affixes the transferred powder image to sheet 212. Preferably, fuser assembly 220 comprises a heated fuser roller 222 and a backup or pressure roller 224. Sheet 212 passes between fuser roller 222 and backup roller 224 with the toner powder image contacting fuser roller 222. In this manner, the toner powder images are permanently affixed to sheet 212. After fusing, a chute, not shown, guides the advancing sheets 212 to the output unit 45, which includes one or more finishers 40 such as a catch tray, stacker, binder, stapler or other output device, for subsequent removal from the printing system by the operator.

After the sheet of support material 212 is separated from photoconductive surface of photoreceptor belt 150, the residual toner particles carried by the non-image areas on the photoconductive surface are removed therefrom. These particles are removed at cleaning station 1, preferably using a cleaning brush or plural brush structure contained in a housing 230. The cleaning brush 240 or brushes 240 are engaged after the composite toner image is transferred to a sheet. Once the photoreceptor belt 150 is cleaned the brushes 240 are retracted utilizing a device incorporating a clutch (not shown) so that the next imaging and development cycle can begin.

System controller 54 regulates the various printer functions. The system controller 54 is preferably a programmable controller, which controls printer functions hereinbefore described. The system controller 54 may provide a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by an operator. Conventional sheet path sensors or switches may be utilized to keep track of the position of the document and the copy sheets.

While the Figures show one example of a printing system incorporating the user interface navigation and control system of the present invention, it is understood that this process could be used in any printing system.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. A printing system for printing image data received from a computer network, scanner or other image data generating device on a support material, comprising:
   a supply unit having a plurality of feeders, wherein each feeder has at least one tray for storing support material;
   a controller including:
      a system controller processing the received image data, and
      a user interface comprising:
         a depiction of a printing system shown on the display screen including icons of at least one feeder, print engine and finisher, and
         a display unit displaying operator information of a desired icon on the display screen by selecting the desired icon;
   a print engine including:
      a charging unit charging a surface of a photoconductive belt,
      a first exposure unit exposing a photoconductive belt to create an electrostatic latent image based on the received image data at the direction of the system controller,
      a first developer unit having first color charged toner particles, which are attracted to the electrostatic latent image,
      a second exposure unit exposing the photoconductive belt based on the received image data at the direction of the system controller,
      a second developer unit having second color charged toner particles, which are attracted to the electrostatic latent image,
      a third exposure unit exposing the photoconductive belt based on the received image data at the direction of the system controller,
      a third developer unit having third color charged toner particles, which are attracted to the electrostatic latent image,
      a fourth exposure unit exposing the photoconductive belt based on the received image data at the direction of the system controller,
      a fourth developer unit having fourth color charged toner particles, which are attracted to the electrostatic latent image,
      a transfer unit receiving support material and transferring the toner from the photoreceptor belt to the support material,
      a fuser assembly receiving the support material from the transfer unit and permanently affixing the toner to the sheet of support material, and a cleaning unit cleaning the photoreceptor belt; and a finishing unit, coupled to the print engine, the finishing unit comprising at least one of a stacker, binder, stapler and inserter.

2. The printing system as in claim 1, wherein the fist color charged toner particles are magenta, the second charged toner particles are yellow, the third charged toner particles are cyan and the fourth charged toner particles are black.

3. A printing system for printing image data received from a computer network, scanner or other image data generating device on a support material, comprising:

a supply unit having a plurality of feeders, wherein each feeder has at least one tray for storing support material;

a controller including:
 a system controller processing the received image data, and
 a user interface comprising:
  a depiction of a printing system shown on the display screen including icons of at least one feeder, print engine and finisher, and
  a display unit displaying operator information of a desired icon on the display screen by selecting the desired icon;

a print engine including:
 a charging unit charging a surface of a photoconductive belt,
 at least one exposure unit exposing a photoconductive belt to create an electrostatic latent image based on the received image data at the direction of the system controller,
 at least one developer unit having charged toner particles, which are attracted to the electrostatic latent image, a transfer unit receiving support material and transferring the toner from the photoreceptor belt to the support material, a fuser assembly receiving the support material from the transfer unit and permanently affixing the toner to the sheet of support material, and a cleaning unit cleaning the photoreceptor belt; and a finishing unit, coupled to the print engine, the finishing unit comprising at least one of a stacker, binder, stapler and inserter.

4. A user interface for a printing system comprising at least one feeder module, at least one print engine module, and at least one finisher module, the user interface comprising:

a feeder icon graphically depicting the feeder module;

a print engine icon graphically depicting the print engine module;

a finisher icon graphically depicting the finisher module;

wherein the feeder Icon, the print engine icon, and the finisher icon are displayed together to collectively form a printer icon graphically depicting the printing system; and wherein selecting one of the feeder icon, the print engine icon, or the finisher icon causes display of information pertaining to the corresponding printing system module.

5. The user interface of claim 4, wherein:

the information displayed upon selecting one of the icons is user-changeable; and changes by the user to the displayed information are transmitted to the printing system.

6. The user interface of claim 5, wherein the user interface includes an input element by which the user changes the user-changeable information.

7. The user interface of claim 6, wherein the input element is a keyboard.

8. The user interface of claim 6, wherein the input element is a computer mouse.

* * * * *